Nov. 25, 1969     A. WINKLER ET AL     3,479,938

PHOTOGRAPHIC CAMERA WITH AUTOMATIC FILM THREADING MEANS

Filed Sept. 15, 1967

INVENTORS
ALFRED WINKLER
HEINZ ERNST
BY
Michael S. Striker
Attorney

United States Patent Office 3,479,938
Patented Nov. 25, 1969

3,479,938
PHOTOGRAPHIC CAMERA WITH AUTOMATIC FILM THREADING MEANS
Alfred Winkler and Heinz Ernst, Munich, Germany, assignors to Agfa-Gevaert Aktiengesellschaft, Leverkusen, Germany
Filed Sept. 15, 1967, Ser. No. 668,017
Claims priority, application Germany, Sept. 24, 1966, A 26,405
Int. Cl. G03b *19/00, 19/04*
U.S. Cl. 95—11
12 Claims

ABSTRACT OF THE DISCLOSURE

A pivoted deflector is provided in the housing of a still camera between the chambers which accommodate unexposed and exposed film. The deflector prevents the curling of the tongue-like leading portion of the roll film into the film window of the camera and prevents the film from becoming stuck in the film winder. The deflector is biased by a spring so as to overlie a cutout provided in the film channel as an extension of that part of the window which is remotest from the chamber for unexposed film. When the leading edge of the film tongue tends to curl into the window, it engages the deflector and causes the latter to turn against the bias of the spring and to ultimately assume a position in which an edge thereon guides the leading edge of the tongue past the window and toward the chamber for the exposed film. The remoted portion of the window is bounded by a slanting edge which registers with an edge of the deflector when the latter yields to the pressure of a curled tongue so that the edge of the window then assists the deflector in directing the tongue past the window and toward the chamber for exposed film.

BACKGROUND OF THE INVENTION

The present invention relates to photographic cameras, and more particularly to improvements in still cameras which utilize roll film and are provided with automatic film threading means.

Roll film for still cameras normally comprises a relatively narrow leading portion or tongue which has a tendency to curl. Such tongue is manipulated by hand during attachment to a takeup reel or during insertion into a takeup cartridge. When the roll film with a tongue-like leading portion is used in cameras with automatic film threading means, i.e., in cameras wherein the leading portion of film is automatically coupled to a takeup reel or automatically enters the mouth of a takeup cartridge which may but need not accommodate a reel, the tendency of the tongue to curl might interfere with proper transport of film toward and with proper attachment of film to the takeup element of the camera. The tongue is normally adjacent to one lateral edge of the film and, when travelling along the film window behind the exposure aperture of the camera, a portion of the tongue overlies the window and tends to curl forwardly into such window so that it becomes stuck and prevents controlled transport of film toward the takeup element. Even a minimal curling of the tongue during travel past the window might cause the leading edge of the tongue to strike against a wall which bounds the window and to prevent proper operation of the film transporting mechanism.

SUMMARY OF THE INVENTION

It is an object of our invention to provide a camera for use with roll film whose leading portion has a tendency to curl into the film window and to construct and assemble the camera in such a way that the curling of leading portion cannot prevent proper transport of film toward and into engagement with a takeup element.

Another object of the invention is to provide a still camera with a device which automatically deflects the leading portion of roll film from the window during travel of such leading portion toward a takeup spool or cartridge so that the leading portion can be automatically coupled to the takeup element without necessitating any manual handling of the film.

A further object of our invention is to provide a camera which can be utilized with roll film having a leading portion which is as wide as or narrower than the remaining length of the film.

An additional object of the invention is to provide a still camera with a film deflecting and guiding device which occupies little room, which can be installed in presently known types of cameras, and which is of simple and inexpensive design so that its mounting in a camera contributes little to the initial cost.

Still another object of the invention is to provide a camera which prevents damage to roll film during automatic coupling with a takeup spool or cartridge.

Briefly outlined, our invention is embodied in a photographic camera, particularly in a still camera, for use with roll film whose leading portion resembles a tongue which is narrower than the width of the major part of film and which tends to curl after leaving the supply cartridge. The camera comprises a housing having a first chamber which can receive a cartridge or reel containing a supply of unexposed roll film and a second chamber for a cartridge or reel which collects exposed film and is preferably of the type capable of being automatically coupled with the leading portion of roll film when the latter is being fed by a suitable film transporting mechanism including one or more sprockets or the like, a film channel provided in the housing between the two chambers to guide the film from the first toward the second chamber and having a window a portion of which is remotest from the first chamber, and yieldable deflector means normally overlying the aforementioned portion of the window under the bias of a suitable spring and having a preferably straight portion in the form of an edge which extends into the path of movement of the leading film portion when the latter tends to curl to guide the film past the window and toward the second chamber. The deflector means may resemble a lever which is pivotably secured to the housing and can yield in a direction toward the second chamber, or a slide which is movable substantially or exactly at right angles to the direction of film travel in the channel.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
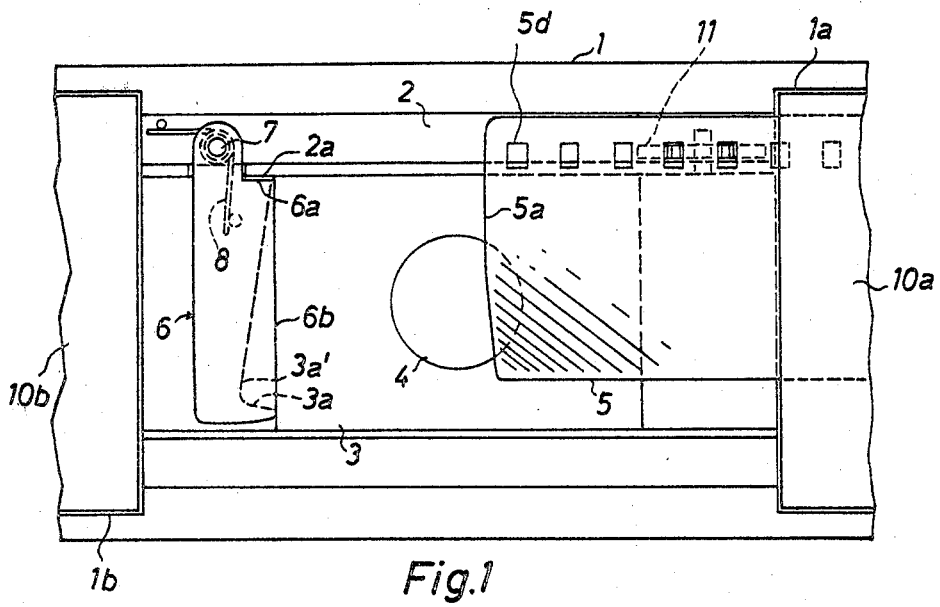
FIG. 1 is a fragmentary rear elevational view of a still camera which embodies our invention, with the rear wall of the housing removed and showing the leading portion of roll film during travel toward the deflector means.

Referring to the drawing in detail, there is shown a portion of a still camera which comprises a housing 1 having a pair of chambers 1a, 1b and a straight film channel 2 which extends between the two chambers and is provided with a window 3 located substantially midway between the chambers. The window 3 is located behind an exposure aperture 4 which can be defined by a diaphragm or by a wall of the housing 1, depending on the type of shutter. The chamber 1a accommodates a supply cartridge 10a for a roll of unexposed film whose relatively narrow leading portion or tongue is shown at 5. The chamber 1b accommodates an empty takeup cartridge 10b of the type which is automatically coupled to the tongue 5 when the latter is transported through and beyond the channel 2 by a suitable film transporting mechanism which preferably includes one or more sprockets 11. The cartridge 10b can be replaced by a reel which is constructed in a way to engage the tongue 5 when the latter enters the chamber 1b. The width of the main portion of film in the supply cartridge 10a corresponds to the width of the channel 2 so that both edge portions of the film travel along the marginal portions of the channel when the sprocket 11 is driven by a wheel or lever, not shown. The takeup cartridge 10b is preferably of the type which can automatically convolute exposed film frames and may but need not accommodate a reel.

Since the unexposed film in the supply cartridge 10a is rolled up and since the width of the tongue 5 is less than the width of the film channel 2, the lower portion of the leading edge 5a on the tongue 5 tends to curl forwardly and into the window 3 when the tongue is transported toward the chamber 1b. Such curling or bending of the lower portion of the tongue 5 might prevent proper transport of the film into the cartridge 10b if the leading edge 5a is allowed to strike against the surface bounding the left-hand side of the window 3, as viewed in the drawing.

In accordance with our invention, the left-hand portion of the window 3 (namely, that portion which is remotest from the chamber 1a and supply cartridge 10a) forms a recess or cutout 3a which is bounded by a straight edge 3a' making an obtuse angle with the direction (arrow A) of travel of the tongue 5 toward the takeup cartridge 10b. The cutout 3a is normally overlapped by a lever-like deflector 6 turnable on a pivot pin 7 which is recessed into the housing 1 adjacent to one marginal portion of the channel 2. The deflector 6 has a shoulder 6a which abuts against a stop shoulder 2a in the channel 2 to maintain a straight edge portion 6b of the deflector in a position at right angles to the direction indicated by the arrow A. That portion of the window 3 which remains exposed when the deflector 6 assumes the normal or starting position of FIG. 1 resembles a rectangle bounded by four straight sides and having a size corresponding to that of a film frame. The cutout 3a extends to the left from that side of the rectangle which is remotest from the chamber 1a. A torsion spring 8 which is coiled around the pivot pin 7 operates between the housing 1 and deflector 6 to normally maintain the shoulder 6a in abutment with the stop shoulder 2a. The edge 3a' at the left-hand side of the cutout 3a registers with and is adjacent to the edge portion 6b of the deflector 6 when the latter is pivoted slightly beyond the position shown in FIG. 2.

Figure 2:
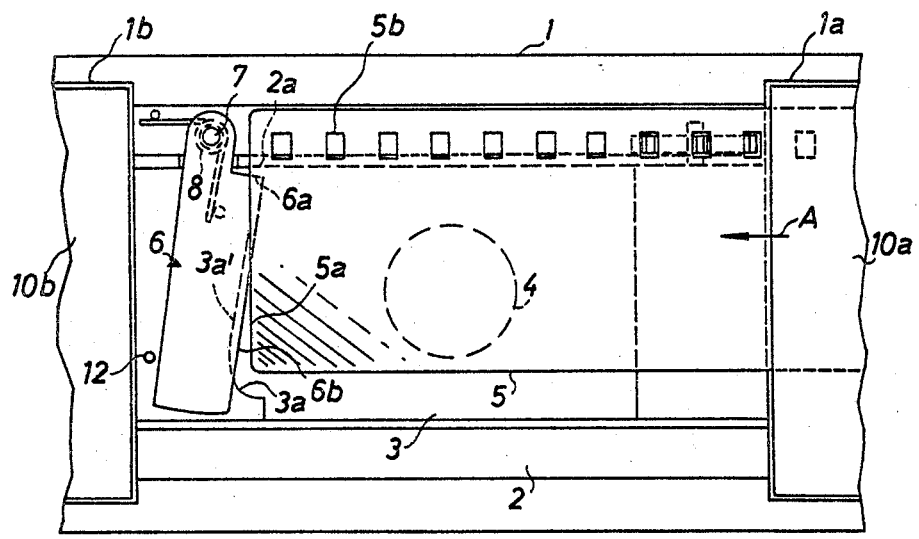
FIG. 2 is a similar view but showing the leading portion of roll film in engagement with the deflector means.

The operation is as follows:

The user inserts into the chamber 1a a fresh supply cartridge 10a and closes the rear wall (not shown) of the housing 1 whereby a conventional pressure plate assumes a position directly behind the window 3 (i.e., in front of the plane of FIG. 1). The foremost portion of the tongue 5 extends from the mouth of the supply cartridge 10a so that its perforations 5b overlie the teeth of the sprocket 11. The user then manipulates the film transporting mechanism to turn the sprocket 11 in a sense to advance the tongue 5 through the upper portion of the channel 2 and toward the takeup cartridge 10b in the chamber 1b. The upper edge portion of the tongue 5 is properly guided by the upper marginal portion of the channel 2 (above the window 3) but the lower portion of the tongue overlies the upper portion of the window and the lower part of the leading edge 5a is likely to curl toward the aperture 4 so that this leading edge ultimately strikes against the edge portion 6b of the deflector 6 which is biased by spring 8 to the starting position shown in FIG. 1. As the sprocket 11 continues to force the tongue 5 toward the takeup cartridge 10b, the leading edge 5a causes the deflector 6 to turn in a clockwise direction toward the inclined position shown in FIG. 2 whereby successive points or increments of the leading edge slide along successive points or increments of the edge portion 6b so that the tongue 5 slides past (behind) the deflector and is free to enter the mouth of the takeup cartridge 10b. If the leading edge 5a turns the edge portion 6b into registry with the straight edge 3a' at the left-hand side of the cutout 3a, the edge 3a' assists the edge portion 6b and contributes to proper guidance of the tongue 5 past the deflector 6 and into the cartridge 10b. The greater the angular displacement of the deflector 6 in a clockwise direction, the more likely is the edge 5a to slide off the edge portion 6b and to be properly transported into the chamber 1b. During such transport of the tongue 5 in the film channel 2, the upper edge portion of the tongue remains in abutment with the upper marginal portion of the channel and slides over the pivot pin 7 and over the eye at the upper end of the deflector 6. The edge portion 6b merely guides that portion of the tongue 5 which overlies the upper part of the window 3 and which is likely to curl into the window.

Of course, as soon as the leading edge 5a moves past the edge portion 6b, the spring 8 is free to return the deflector 6 to the starting position of FIG. 1 so that the cutout 3a is fully covered by the deflector and the effective part of the window 3 resembles a rectangle whose size corresponds to that of an unexposed film frame. In other words, the window 3 exposes a full-sized film frame even before the leading edge 5a enters the mouth of the takeup cartridge 10b.

The drawing merely shows one presently preferred embodiment of our invention. However, the camera is susceptible of many modifications without departing from the spirit of the present invention. For example, the deflector 6 may be replaced by a slide-like deflector which is moveable up and down, as viewed in FIG. 1 or 2, to yield in response to pressure transmitted by the leading edge 5a and to return to a normal position under the bias of a suitable spring as soon as the leading edge is properly transported past the window. In such starting position, the slide-like deflector overlies the cutout 3a substantially in the same way as shown for the deflector 6 in FIG. 1. Furthermore, the housing 1 may be provided with a stop or abutment 12 (shown in FIG. 2) serving to arrest the deflector 6 in a position in which its edge portion 6b registers with the edge 3a' at the left-hand side of the cutout 3a. Still further, the abutment 12 can be placed in such position that the deflector 6 cannot move its edge portion 6b into registry with the edge 3a', i.e., that the edge 3a' cannot assist the deflector in guiding the tongue toward the chamber 1b. The spring 8 can be replaced by a leaf spring or by a helical spring which pushes or pulls the deflector 6 to the position shown in FIG. 1.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

What is claimed as new and desired to be protected by Letters Patent is set forth in the appended claims:

1. In a photographic camera for use with roll film whose leading portion tends to curl, a combination comprising a housing having a first chamber arranged to accommodate a supply of unexposed roll film and a second chamber arranged to collect exposed roll film; a a film channel provided in said housing between said chambers to guide the film from said first to said second chamber and having a window a portion of which is remote from said first chamber; means for transporting the film from said first chamber to said second chamber; and yieldable deflector means normally overlying said portion of said window and having a portion extending into the path of movement of the leading portion of film to guide the film past said portion of the window and toward said second chamber.

2. A combination as defined in claim 1, wherein the size of said window minus said portion thereof corresponds to that of a film frame.

3. The combination as defined in claim 1, further comprising biasing means for urging said deflector means to a starting position in which the latter overlies said portion of the window.

4. A combination as defined in claim 3, further comprising stop means provided on said housing for holding the deflector means against movement under the action of said biasing means beyond said starting position thereof.

5. A combination as defined in claim 1, wherein said window minus said portion thereof is of rectangular outline and has a side remote from said first chamber, said portion being in communication with said side and being bounded by a substantially straight edge which makes an obtuse angle with the direction of film travel from said first to said second chamber.

6. A combination as defined in claim 5, wherein said portion of said deflector means registers with said edge when said deflector means yields in response to engagement by the leading portion of film during transport of such leading portion toward said second chamber.

7. A combination as defined in claim 5, wherein said edge slants in a direction from said first toward said second chamber to assist said deflector means in guiding the leading portion of film toward said second chamber.

8. A combination as defined in claim 1, wherein said deflector means comprises a lever and a pivot member turnably securing said lever to said housing, and further comprising resilient means for biasing said lever so that said portion of the lever normally extends substantially at right angles to the direction of film travel.

9. A combination as defined in claim 8, wherein said resilient means comprises a torsion spring coiled around said pivot member.

10. A combination as defined in claim 8, wherein said pivot member is adjacent to one marginal portion of said channel.

11. A combination as defined in claim 1, wherein, when said deflector means overlies said portion of the window the uncovered part of the window resembles a rectangle having a size corresponding to that of a film frame.

12. A combination as defined in claim 11, wherein said channel is straight and wherein said window is located substantially midway between said chambers.

References Cited

UNITED STATES PATENTS 3,033,074   5/1962   Schaefer _____ 352—224

FOREIGN PATENTS 1,245,711   7/1967   Germany.
235,992   7/1925   Great Britain.

NORTON ANSHER, Primary Examiner

ROBERT P. GREINER, Assistant Examiner

U.S. Cl. X.R.

95—31